(12) United States Patent
Bauberger

(10) Patent No.: US 7,651,130 B2
(45) Date of Patent: Jan. 26, 2010

(54) AIRBAG UNIT

(75) Inventor: Alfred Bauberger, Garching (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/224,346

(22) PCT Filed: Apr. 10, 2007

(86) PCT No.: PCT/EP2007/003176

§ 371 (c)(1),
(2), (4) Date: Aug. 25, 2008

(87) PCT Pub. No.: WO2007/115818

PCT Pub. Date: Oct. 18, 2007

(65) Prior Publication Data

US 2009/0020989 A1 Jan. 22, 2009

(30) Foreign Application Priority Data

Apr. 11, 2006 (DE) .................. 10 2006 017 332

(51) Int. Cl.
*B60R 21/16* (2006.01)
(52) U.S. Cl. .................................................. 280/743.2
(58) Field of Classification Search ............. 280/743.2, 280/743.1, 736
See application file for complete search history.

(56) References Cited

U.S. PATENT DOCUMENTS 6,126,196 A * 10/2000 Zimmerman ................ 280/739
6,832,778 B2 12/2004 Pinsenschaum et al.
2003/0020268 A1* 1/2003 Reiter et al. ................. 280/742
2004/0090054 A1* 5/2004 Bossecker et al. ........... 280/739
2004/0130135 A1* 7/2004 Ekdahl ....................... 280/739
2006/0071461 A1 4/2006 Williams

FOREIGN PATENT DOCUMENTS

DE 297 07 162 U1 6/1997
EP 09 17 994 A1 5/1999
JP 05 085295 A 4/1993

OTHER PUBLICATIONS

International Search Report and Written Opinion of the ISA for PCT/EP2007/003176, ISA/EP, mailed Aug. 1, 2007.

* cited by examiner

*Primary Examiner*—Faye M. Fleming
(74) *Attorney, Agent, or Firm*—Harness, Dickey & Pierce, P.L.C.

(57) ABSTRACT

An airbag unit with an airbag exhibiting an impact surface, a housing, a gas generator, a first tensioning element extending from housing to impact surface, which is interrupted when the airbag is fully expanded, and a second tensioning element extending from impact surface to an outlet valve with variable cross section located in airbag. The cross section of the outlet valve becomes smaller when the second tensioning element is under tension. In order to ensure a high degree of functional reliability, outlet valve exhibits a nozzle extending around an opening, around which the second tensioning element is guided.

3 Claims, 4 Drawing Sheets

AIRBAG UNIT

CROSS-REFERENCE TO RELATED APPLICATIONS

This application is a 371 U.S. National Stage of International Application No. PCT/EP2007/003176, filed Apr. 10, 2007 and published in English as WO 2007/115818A1 on Apr. 10, 2007. This application claims priority to German Patent Application No. DE 10 2006 017 332.5, filed Apr. 11, 2006, which application is herein expressly incorporated by reference.

TECHNICAL FIELD OF THE INVENTION

The invention relates to an airbag unit according to the introductory section of claim 1.

A general task for airbag units, in particular front airbag units, is to supply an expanded airbag for each accident situation and for each vehicle occupant which on the one hand should exhibit sufficient retaining effect and on the other hand should not transfer too high forces into the occupant. The following framework is conditions should basically be taken into consideration in this context: both the seriousness of the accident and the weight of the vehicle occupant to be protected can vary on a large scale. Furthermore, the vehicle occupant is not always in the standard seating position at the time of the accident and it may be that he or she is not wearing a seat belt.

One possibility of designing the airbag unit so that it can react to different situations is to make use of a two-stage gas generator, so that the internal pressure and therefore the hardness of the airbag are variable.

PRIOR ART

An airbag unit with variable depth is known from U.S. Pat. No. 6,832,778 B2. Here, a tensioning element, for example a tensioning thread, extends from the housing or from the gas generator directly or indirectly up to the impact surface of the airbag. In a first deployment state, this tensioning element connects the housing with the impact surface, so that the distance from the impact surface to the housing is defined by the length of this tensioning element. In a second completely deployed state, the tensioning element is interrupted and the distance of the impact surface from the housing is increased, i.e. the depth of the airbag becomes larger.

This patent document also proposes connecting an outlet valve directly or indirectly with the impact surface via a second tensioning element, whereby this second tensioning element is basically not subject to any forces when the airbag is not fully expanded (first deployment state) and which is subject to tension when the airbag is fully expanded (second deployment state), whereby the tensioning state of this second tensioning element has an influence on the effective cross-section of the outlet valve. In particular, the outlet valve can be of such a form that when the second tensioning element is under tension, its effective cross-section is reduced and in particular is completely closed. Therefore it is possible to achieve the result that the airbag remains relatively soft in its first deployment state, which is particularly put into effect when an out-of-position situation is detected, and therefore does not place the vehicle occupant at risk and still to achieve the result that the airbag nevertheless reaches the necessary internal pressure in the second, fully deployed state. Furthermore it is ensured that the outlet valve also remains open if the impact surface strikes an obstacle during deployment of the airbag before the maximum depth is reached.

Two types of outlet valves are described in U.S. Pat. No. 6,832,788 B2. On the one hand it is proposed to arrange a strip of fabric containing a hole movably on the airbag wall by means of straps and to connect it with the second tensioning element. This means that this fabric element is displaced when the second tensioning element is under tension and changes its position in relation to the airbag wall, which also exhibits a hole, so that depending on the position of the fabric element, the relative position of the two holes and their overlap is changed. Such an outlet valve is complicated to manufacture and it must be ensured that the outlet valve remains functional when the airbag deploys.

Furthermore, an outlet valve is proposed which exhibits a fabric tab sewn onto the wall of the airbag, said fabric tab covering a hole in the airbag wall. The second tensioning element extends directly or indirectly to the impact surface from this fabric tab. If the second tensioning element is under tension, the fabric tab is pushed onto the hole which lies underneath it in the airbag wall and the outlet valve is closed. A particular disadvantage here, is that it is difficult to achieve sealing of the outlet valve, as the fabric tab has to be moved against the internal pressure of the airbag, and the airbag wall against which the fabric tab is supported is naturally made of flexible woven material.

SUMMARY OF THE INVENTION

Starting from this it is the task of the invention to improve an airbag unit of the generic type so that the at least one outlet valve is securely closed.

This task is fulfilled by an airbag unit with the characteristics of claim 1.

According to the invention, the outlet valve is constructed as follows: a fabric nozzle extends round an opening in the airbag wall, and the second tensioning element, which extends directly or indirectly to the impact surface, is guided around this fabric nozzle, so that when pulling takes place it draws the fabric nozzle together and therefore reduces the effective outlet cross-section or even closes it completely. Such an outlet valve can easily be folded and it is not necessary that the element which closes the opening is supported against the airbag wall when it closes. This achieves reliable functioning.

In a preferred embodiment, the nozzle is pulled over to the outside when the outlet valve is open, and when the valve closes it is first pulled into the interior of the airbag, and the actual closing of the outlet valve follows.

Further preferred embodiments result from the subclaims and from the embodiments now explained in more detail with reference to the drawings.

DESCRIPTION OF PREFERRED EMBODIMENTS

Figure 1:
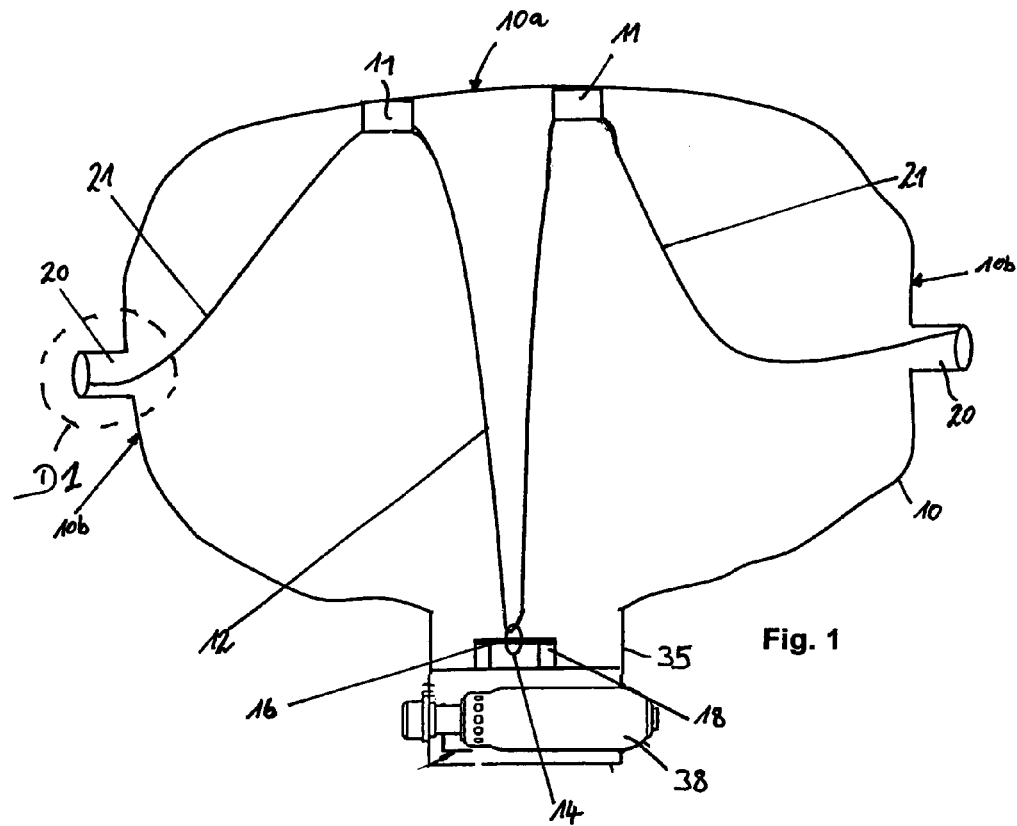
FIG. 1 An airbag unit, whereby the airbag is in a first deployed state.

FIG. 1 shows an airbag unit whereby the airbag is in a first, incompletely deployed state. When in quiescent state, airbag 10 is folded into a housing 35, in which gas generator 38 is also accommodated. FIG. 1 shows a situation in which the airbag is in a first, partly deployed state. In this deployment state, impact surface 10a is connected with the housing by means of a first tensioning element. This first tensioning element is built up as follows: The retaining part 18, on which retaining bolt 16 is detachably arranged, is connected with housing 35. Separation of retaining bolt 16 from retaining part 18 can be triggered for example electromagnetically or pyrotechnically on an external signal. Retaining bolt 16 extends through ring 14, through which again the first tensioning thread 12 extends, whose both ends are connected with impact surface 10a of airbag 10 by means of fixing straps 11. From these fixing straps 11, furthermore two second tensioning threads 21, which serve as second tensioning elements, extend to the two outlet valves 20.

Figure 2:
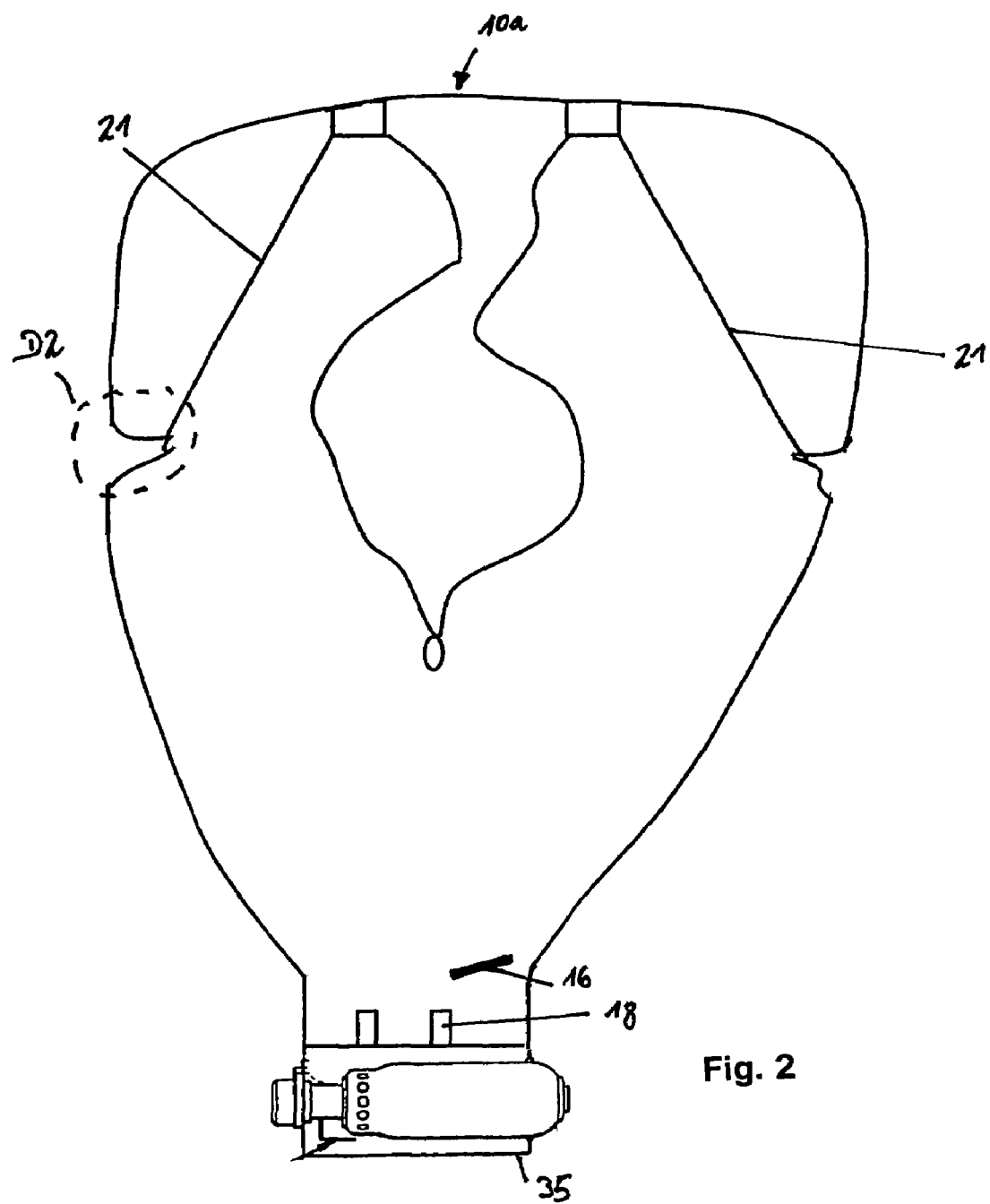
FIG. 2 The airbag unit from FIG. 1, whereby the airbag is in its second deployed state, FIG. 3 Detail D1 from FIG. 1, FIG. 4 Detail D2 from FIG. 2

If the full depth of the airbag is to be achieved, the connection between retaining bolt 16 and retaining part 18 is separated, so that the distance of impact surface 10a from housing 35 can increase, until the second deployment state shown in FIG. 2 is reached. It is possible in principle that tethers are present which define the distance between impact surface 10a and housing 35.

Figure 3:
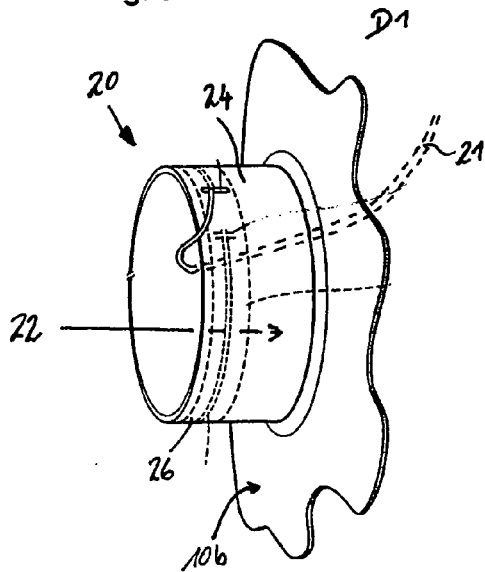
Figure 4:
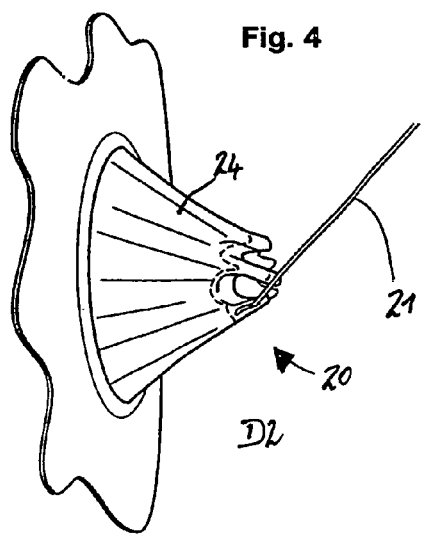

As can be seen by comparison of FIGS. 1 and 2, the second tensioning threads 21 are in tension-free state in the first incompletely deployed state shown in FIG. 1. The outlet valves 20, at which second tensioning threads 21 end, are hereby open. In the completely deployed state shown in FIG. 2, second tensioning threads 21 are under tension and outlet valves 20 are completely or partially closed. The structure and functional principle of outlet valves 20 which are only shown schematically in FIGS. 1 and 2, are now explained with reference to FIGS. 3 and 4:

At the position at which an outlet valve 20 is situated, side surface 10b of airbag 10 exhibits an opening 22. From the edge of this opening 22, a nozzle 24 consisting of fabric extends. This nozzle is of annular shape when outlet valve 20 is open as shown in FIG. 3. A tunnel 26 of fabric is provided on the edge of nozzle 24 turned away from the airbag fabric, through which second tensioning thread 21 extends. In the first embodiment shown in FIGS. 3 and 4, the end of the first tensioning thread 12 is connected to the nozzle 24. If as is shown in FIG. 4, second tensioning thread 21 is placed under tension—which occurs when airbag 10 reaches its maximum deployed state—first nozzle 24 is pulled over into the inside of airbag 10 and then pulled together, until the state shown in FIG. 4 is reached. It can be seen that the effective cross-section of outlet valve 20 is then considerably smaller than opening 22. The pressure inside the airbag 10 obstructs the drawing together of the nozzle 24 by the second tensioning thread 21 not, or only slightly.

Figure 5:
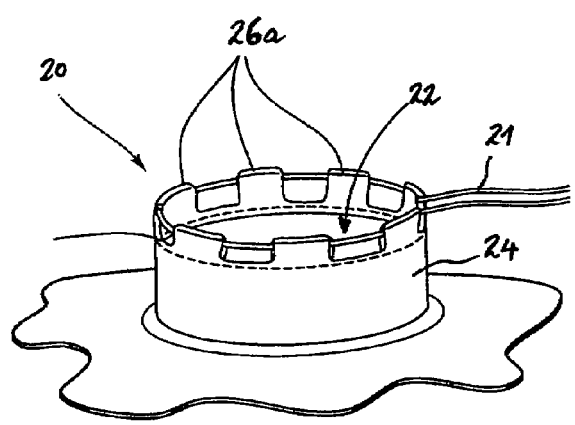
FIG. 5 A second embodiment of an outlet valve.
Figure 6:
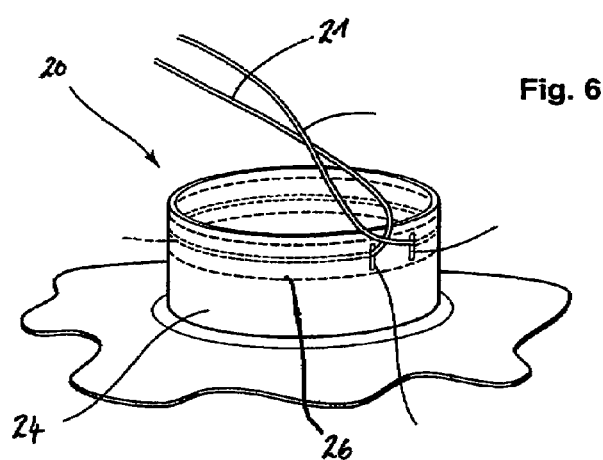
FIG. 6 A third embodiment of an outlet valve.

FIGS. 5 and 6 show variants of an outlet valve 20, whereby, however, the same basic principle applies. The main difference as compared with the aforementioned embodiment is that second tensioning thread 21 does not end at nozzle 24, but only surrounds it and both ends of second tensioning thread 21 are directly or indirectly connected with impact surface 10a of airbag 10. In the embodiment shown in FIG. 5, tunnel 26 is formed by several double-walled straps 26a at a distance from one another.

Figure 7:
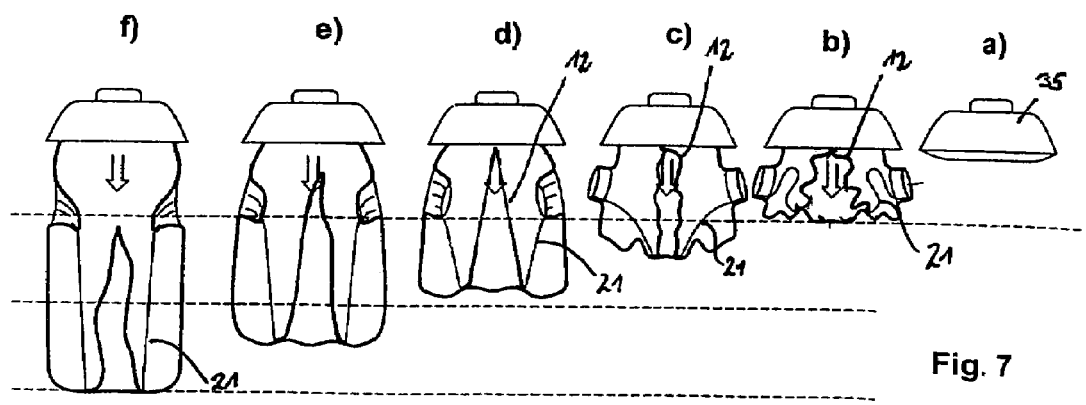
FIG. 7 A representation of an airbag unit during expansion of the airbag.

FIG. 7 shows deployment of an airbag at various stages. Stage a) is before the start of the deployment, here only housing 35 is shown. The beginning of the deployment b) corresponds to the deployment of a conventional airbag. In state c) the second tensioning threads 21 are slightly tensioned, so that during the further deployment nozzles 24 of outlet valves 20 are turned over to the inside, until state d) is reached. In this state, the first tensioning thread 12 is also tensioned, so that the first deployment state is achieved. If first tensioning thread 12 is not separated from housing 35, no further expansion of airbag 10 takes place. If first tensioning thread 12 is separated, the airbag continues to deploy until final state f) is reached, in which outlet valves 20 are closed. In stage e), the outlet valves are already partially closed.

Figure 8:
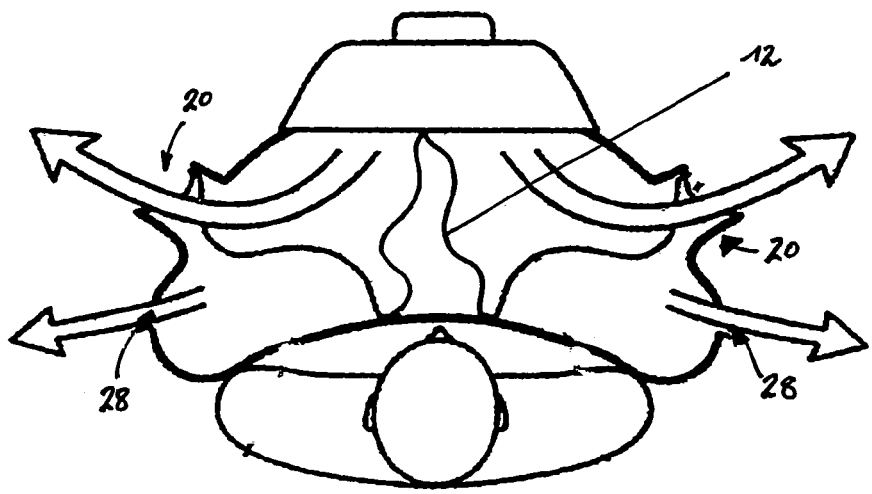
FIG. 8 An airbag unit, whereby the airbag meets an obstacle before achieving its maximum depth and FIG. 9 A second embodiment of an airbag unit.

As can be seen in FIG. 8, outlet valves 20 continue to be open even if the connection of the one or several first tensioning threads 12 with housing 35 is interrupted but the impact surface strikes an obstacle, in particular a vehicle occupant who is outside the standard seating position, before achieving the fully deployed state. The outlet valves 20 remain open and the airbag is relatively soft. In FIG. 8 it can also be seen that the airbag can exhibit further outlet openings 28, which are open in every deployment state.

Figure 9:
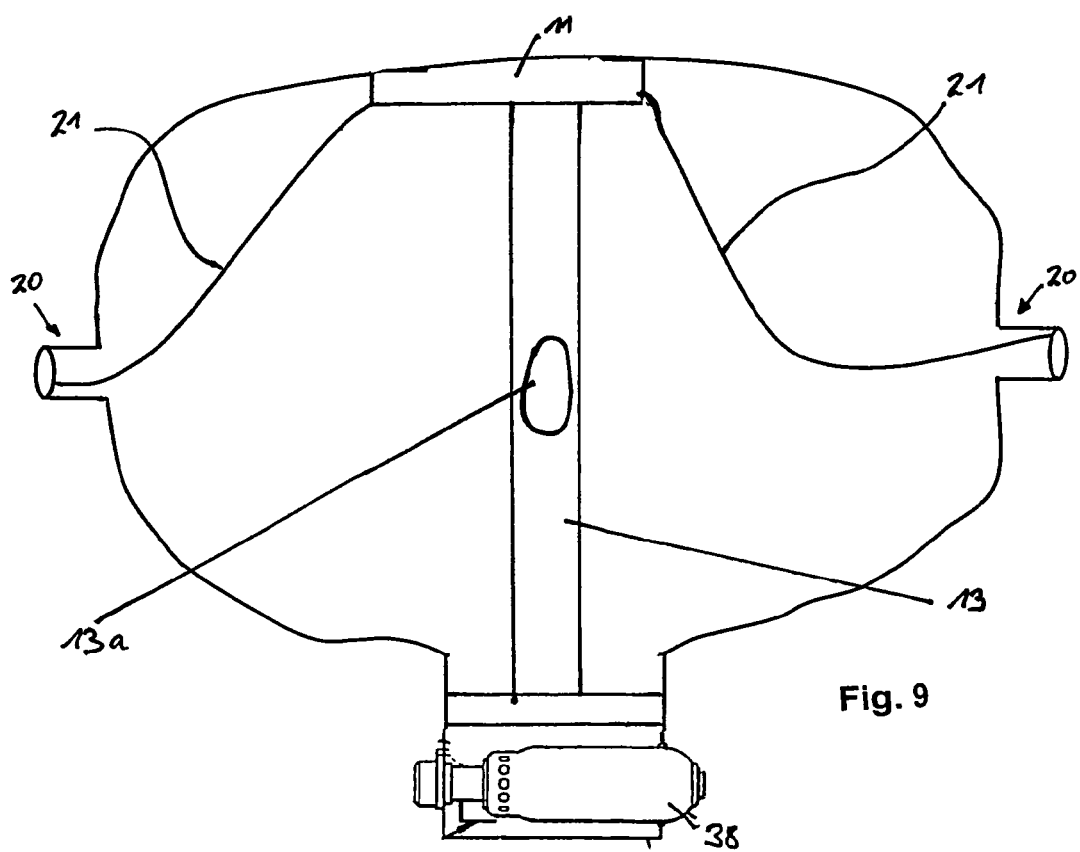

FIG. 9 shows a second embodiment of an airbag unit. Here, the first tensioning element is in the form of a tether 13 with a set break location 13a. This set break location 13a is formed in such a way that tether 13 remains intact if only the first stage of a two-stage gas generator 38 is triggered. However, if the internal pressure in the airbag increases by triggering of the second stage of the gas generator also, the tether tears at set break location 13a and airbag 10 expands to its maximum depth, as described above. Structure and function of outlet valve 20 and its triggering by second tensioning thread 21 is also as described above, so that this does not need to be explained again here. It is also possible to so set up the break location as a tear seam tearing on exceed of a predetermined force. This tear seam can especially be provided at the connection of the tether with the retaining part or with the impact surface. The break location can be provided alternatively or additionally to the possibility to disconnect the tensioning element on an external signal.

LIST OF REFERENCE NUMBERS

10 Airbag
10a Impact surface
10b Side surface
11 Fixing strap
12 First tensioning thread
14 Ring
16 Retaining bolt
18 Retaining part
20 Outlet valve
21 Second tensioning thread
22 Opening
24 Nozzle
26 Tunnel
26a Double-wall strap
30 Further outlet opening
35 Housing
38 Gas generator

The invention claimed is:

1. An airbag unit comprising:

an airbag having an impact surface and adapted to be selectively inflatable to one of a first depth and a second depth greater than the first depth, the airbag including first and second outlet valves normally operative in a first state, the first state being one of an open state and a restricted state;

a housing;

a gas generator;

a first tensioning member having first and second ends fixed proximate the impact surface and an intermediate portion therebetween normally retained proximate the housing;

a second tensioning member having a first end fixed proximate the impact surface and extending to the first outlet valve to transition the first outlet valve from a first state to a second state when under tension; and a third member having a first end fixed proximate the impact surface and extending to the second outlet valve to transition the second outlet valve from the first state to the second state when under tension;

wherein the first state is an open state and the second state is a restricted state.

2. The airbag unit of claim 1, further comprising a release mechanism for releasing the intermediate portion of the first tensioning member from proximate the housing in response to a predetermined event.

3. The airbag unit of claim 2, wherein the release mechanism includes a ring through which the first tensioning member extends.

* * * * *